US007978465B2

(12) United States Patent
Osaka et al.

(10) Patent No.: US 7,978,465 B2
(45) Date of Patent: Jul. 12, 2011

(54) FUNCTION EXPANDING METHOD FOR SMALL-SIZED DISPLAY DEVICE

(75) Inventors: Hiroshi Osaka, Tokyo (JP); Yasuhiko Murai, Tokyo (JP); Hiroyuki Kuramoto, Tokyo (JP); Koichi Uchimura, Tokyo (JP)

(73) Assignee: Koyo Electronics Industries Co., Ltd., Tokyo (JP)

( * ) Notice: Subject to any disclaimer, the term of this patent is extended or adjusted under 35 U.S.C. 154(b) by 167 days.

(21) Appl. No.: 11/984,219

(22) Filed: Nov. 14, 2007

(65) Prior Publication Data

US 2008/0112118 A1 May 15, 2008

(30) Foreign Application Priority Data

Nov. 15, 2006 (JP) .................... 2006-308803

(51) Int. Cl.
*G06F 1/16* (2006.01)
(52) U.S. Cl. ......... 361/679.22; 361/679.21; 361/679.26; 361/735; 248/917
(58) Field of Classification Search ............. 361/679.41, 361/735
See application file for complete search history.

(56) References Cited

U.S. PATENT DOCUMENTS

| | | | | |
|---|---|---|---|---|
| 4,964,018 A * | 10/1990 | Mallory et al. | ............... | 361/725 |
| 4,969,830 A * | 11/1990 | Daly et al. | ..................... | 439/136 |
| 5,202,817 A * | 4/1993 | Koenck et al. | ............ | 361/679.09 |
| 5,479,001 A * | 12/1995 | Kumar | ..................... | 235/472.02 |
| 5,484,991 A * | 1/1996 | Sherman et al. | .......... | 235/472.01 |
| 5,619,397 A * | 4/1997 | Honda et al. | ............. | 361/679.43 |
| 5,645,434 A * | 7/1997 | Leung | ............... | 439/74 |
| 5,677,830 A * | 10/1997 | Nogas et al. | .................... | 361/790 |
| 5,859,628 A * | 1/1999 | Ross et al. | ..................... | 345/173 |
| 5,898,162 A * | 4/1999 | Koenck et al. | ........... | 235/472.01 |
| 5,909,357 A * | 6/1999 | Orr | ......................... | 361/679.46 |
| 5,959,287 A * | 9/1999 | Myers et al. | ............. | 235/472.02 |
| 6,027,828 A * | 2/2000 | Hahn | .......................... | 429/100 |
| 6,028,764 A * | 2/2000 | Richardson et al. | ..... | 361/679.29 |
| 6,102,284 A * | 8/2000 | Myers et al. | ................... | 235/375 |
| 6,118,663 A * | 9/2000 | Fan | ................. | 361/725 |
| 6,185,110 B1 * | 2/2001 | Liu | ............... | 361/829 |
| 6,216,185 B1 * | 4/2001 | Chu | ................ | 710/303 |
| 6,426,872 B1 * | 7/2002 | Sutton et al. | ............. | 361/679.41 |
| 6,657,654 B2 * | 12/2003 | Narayanaswami | ........ | 348/14.04 |
| 6,661,648 B2 * | 12/2003 | Dayley | ....................... | 361/679.6 |
| 6,760,637 B2 * | 7/2004 | Clidaras et al. | .................. | 700/95 |
| 6,795,318 B2 * | 9/2004 | Haas et al. | ..................... | 361/729 |
| 6,989,987 B1 * | 1/2006 | Wilson et al. | ............ | 361/679.02 |
| 7,092,248 B2 * | 8/2006 | Shu | .......................... | 361/679.21 |
| 7,170,557 B2 * | 1/2007 | Manico et al. | ........... | 348/333.07 |
| 7,173,818 B2 * | 2/2007 | Hou et al. | ................ | 361/679.56 |

(Continued)

FOREIGN PATENT DOCUMENTS

JP 11-215217 8/1999

(Continued)

*Primary Examiner* — Jayprakash N Gandhi
*Assistant Examiner* — Anthony Q Edwards
(74) *Attorney, Agent, or Firm* — McDermott Will & Emery LLP (57) ABSTRACT

The function expanding method for a display device comprises: a step of preparing a plurality of types of function expanding modules; a step of selecting a function expanding module or modules from the plurality of types of function expanding modules; and a step of stacking the selected single or plurality of function expanding module(s) to a rear part of the display device at will, and connecting the module(s) by using expanding connector(s).

2 Claims, 7 Drawing Sheets

U.S. PATENT DOCUMENTS

| | | | |
|---|---|---|---|
| 7,233,486 B2 * | 6/2007 | Kim | 361/679.29 |
| 7,376,779 B2 * | 5/2008 | Chu | 710/313 |
| 7,477,510 B2 * | 1/2009 | Liu | 1/1 |
| 7,499,029 B2 * | 3/2009 | Hara | 345/168 |
| 7,499,282 B1 * | 3/2009 | Loucks | 361/730 |
| 7,599,172 B2 * | 10/2009 | Barreau et al. | 361/657 |
| 7,599,178 B2 * | 10/2009 | Huang et al. | 361/679.43 |
| 2002/0126442 A1 * | 9/2002 | Lim et al. | 361/681 |
| 2003/0007321 A1 * | 1/2003 | Dayley | 361/683 |
| 2003/0156383 A1 * | 8/2003 | Jenkins et al. | 361/683 |
| 2003/0198008 A1 * | 10/2003 | Leapman et al. | 361/681 |
| 2007/0079042 A1 * | 4/2007 | Crosswy et al. | 710/303 |
| 2008/0112118 A1 * | 5/2008 | Osaka et al. | 361/681 |

FOREIGN PATENT DOCUMENTS

JP    2003-018678    1/2003

* cited by examiner

FIG. 8

FUNCTION EXPANDING METHOD FOR SMALL-SIZED DISPLAY DEVICE

BACKGROUND OF THE INVENTION

1. Field of the Invention

The present invention relates to a function expanding method for a display device which displays conditions of an external apparatus that is controlled by a programmable controller. The programmable controller is a so-called programmable logic controller, a PLC, a sequencer, or the like, and it is referred to as a PLC hereinafter.

2. Description of the Related Art

PLCs are used for controlling external apparatuses such as factory equipment. As an HMI (human-machine interface) of a control system, a display device can display conditions of an external apparatus controlled by the PLC and can operate the external apparatus as well. An operation component (HMI component) for operating the external apparatus is displayed on the display device. A user operates the external apparatus through operating the operation component displayed on the display device. An example of such display device is a programmable display device, which is used by being installed at a place where a control board and the like are placed.

The industrial usage of this type of display device has been expanded dramatically, and such display device has been used by being installed at places where there are drastic changes in environmental temperatures and at scenes of cold districts and the like. The display device includes a type which comprises a touch panel for allowing a direct operation of the operation component that is displayed on a display screen, and a type which comprises no touch panel so that the operation component on the display screen cannot be touch-operated with fingers and the like directly. Further, the display device is normally fitted into a display device attachment opening of a control board (not shown) from a front of the display device main body so as to be engaged with an outer periphery of the display device attachment opening to be fixedly mounted to the opening.

While such device is required to comprise various functions in accordance with the expansion of its usage, usage of small-sized and inexpensive display devices has been expanding.

However, when the display device is small, it is difficult to mount various required functions to that single device. Thus, small-sized display devices corresponding to each required function are fabricated in the actual circumstances. Because of that, the manufacturing cost becomes increased. Further, the required functions may change at the scene, so that it is not easy to follow the changes. In such case, it becomes necessary to prepare many types of small-sized display devices, for example, thereby increasing the cost as well as the time and effort further.

Even if various types of slots and connectors are attached to a rear part of the small-sized display device and function expanding modules are mounted to those slots and connectors so as to expand the functions of the small-sized display device, the number of function expanding modules placed thereto is restricted because the area of the rear part is small. Further, when the function expanding modules are placed in other parts than the rear part of the small-sized display device, the advantage of the small-sized device as being small in size, becomes spoiled.

Japanese Unexamined Patent Publication H11-215217 discloses a technique which makes it possible to mount a plurality of types of option apparatuses (function expanding modules) to a casing of a portable information terminal device simultaneously, and makes it possible to operate any of the arbitrary option apparatuses that are mounted to an option apparatus mount mechanism through operations of a touch panel of a display device.

Japanese Unexamined Patent Publication 2003-018678 discloses a technique which makes it possible to select function expanding modules that can collect prescribed monitor data among a plurality of types of function expanding modules which can collect different monitor data from each other except specific monitor data, and makes it possible to connect those selected modules detachably and to be capable of performing data communication with each other.

SUMMARY OF THE INVENTION

The main object of the present invention therefore is to provide a function expanding method for a display device, which can expand the functions at will while maintaining the advantage of the display device as being small in size.

In order to achieve the foregoing object, the function expanding method of the present invention is a method for expanding functions of a display device that is provided with an internal circuit to be capable of being used even by itself for displaying a condition of an external apparatus that is controlled by a programmable controller.

The present invention is a function expanding method for expanding functions of a display device that is provided with an internal circuit to be capable of being used even by itself for displaying a condition of an external apparatus that is controlled by a programmable controller. The method comprises:

a first step of preparing a plurality of types of function expanding modules, each of which comprises a built-in function expanding circuit for the display device;

a second step of selecting a function expanding module from the plurality of types of function expanding modules prepared in advance; and a third step of stacking the selected function expanding module to a rear part of the display device, and electrically connecting the display device and the internal circuit of the function expanding module to expand the functions of the display device.

The above-described display device includes not only a display device with a touch panel but also a display device without a display panel.

The internal circuit and the like of the function expanding module is loaded on a substrate, or the entire or a part of the function extending module is surrounded by a case, and an extending connector is attached to the case.

With the function expanding method of the present invention, the function expanding modules corresponding to the expanding functions of the display device are prepared in advance. Thus, it is possible to select the function expanding module that corresponds to a change in the usage of the display device, addition of a function, or the like. Then, by stacking the selected function expanding module to the rear part of the display device, the circuit for expanding the function of the function expanding module can be electrically connected to the internal circuit of the display device so as to expand the functions of the display device. In that case, when the display device is a small-sized device, the functions of the display device can be expanded at will without spoiling the advantage thereof as being small in size.

Preferably, the first step prepares: a display device that comprises an expanding connector provided at its rear part; a plurality of types of bezels, each of which comprises on its front side an opening that is capable of housing the display device, as well as operation keys, an output-side expanding connector at a bottom part of the opening, and an input-side expanding connector on a rear part side; and a plurality of types of function expanding modules, each of which comprises an expanding connector on its back side.

Preferably, the second step selects a single bezel from the plurality of types of bezels, and selects a single function expanding module (a specific function expanding module) from the plurality of types of function expanding modules.

Preferably, the third step houses the display device in the opening of the selected bezel and connects the output-side expanding connector of the bezel to the expanding connector of the display device and, further, loads the selected specific function expanding module on the rear part of the bezel and connects the input-side expanding connector at the rear part of the bezel to the expanding module of the specific function expanding module.

A display device unit according to the present invention comprises a display device that is provided with an internal circuit to be capable of being used even by itself, and a plurality of function expanding modules, each of which comprises an internal circuit for expanding functions of the display device, wherein:

the display device and the plurality of function expanding module respectively comprises an expanding connector for electrically connecting the respective internal circuits by being mechanically connected to each other, under a state where each of the function expanding modules is stacked in a rear part of the display device; and the display device can be used by itself under a state where the modules are not being stacked, and the functions of the display device can be expanded by the internal circuits of the function expanding modules when the display device and respective internal circuits of each of the function expanding modules are connected through both of the expanding connectors under a state where the modules are loaded by being stacked.

Even if the display device is small so that the area of the rear part thereof is small, there is no restriction set in the display device unit of the present invention regarding the number of function expanding modules to be placed, since the function expanding modules are stacked to be loaded on the rear part of the display device. Further, when the display device is small, the functions of the display device can be expanded without spoiling the advantage of the display device as being small in size.

A preferable form of the present invention is that the above-described function expanding module is a bezel that comprises an opening for housing the display device detachably and comprises operation keys, and that the above-described bezel allows operations of the display device mounted to the opening through the operation keys.

With this form, display of the display screen can be control-operated through the operation keys of the bezel whether there is a touch panel on the display screen of the display device or not. Particularly, when hand operations cannot be performed easily because the display screen is small since it is a small-sized display device, the operation keys of the above-described bezel are convenient since the keys allow the user to operate the display control easily.

A preferable form of the present invention is that the above-described bezel is capable of loading another function module on its rear part.

This form makes it possible to stack another function expanding module on the rear part of the bezel easily.

A preferable form of the present invention is that the above-described display device can be housed in openings of different types of bezels.

With this form, different types of bezels can be used for the display device. Therefore, it becomes possible to expand the functions of the display device in more various ways by using the bezels having different arrangements of the operations keys, for example.

A preferable form of the present invention is that the above-described function expanding module is a module that comprises a plurality of expanding functions.

This form is convenient since it can suppress an increase in the number of provided function expanding modules for expanding the usage of the display device further, through providing the plurality of function expanding modules to a singe function expanding module.

Examples of the expanding functions are a power supply function, a serial communication function, an I/O function, an Ethernet (registered trademark) function. These functions can be used alone or in combination.

It is possible with the present invention to load the function expanding modules at a small rear part while having no restriction in the number of the function expanding modules to be placed without spoiling the advantage of the display device as being small in size. Therefore, the functions of the display device can be expanded effectively.

BRIEF DESCRIPTION OF THE DRAWINGS

Other objects of the present invention will become clear from the following description of the preferred embodiments and the appended claims. Those skilled in the art will appreciate that there are many other advantages of the present invention possible by embodying the present invention.

DETAILED DESCRIPTION OF THE INVENTION

Preferred embodiments of the present invention will be described hereinafter by referring to the accompanying drawings.

Figure 1A:
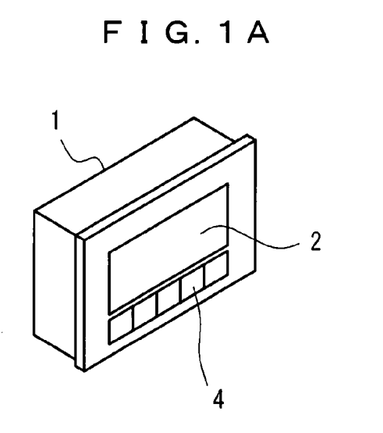
FIG. 1A is a perspective view taken from the front of a small-sized display device according to embodiments of the present invention.
Figure 1B:
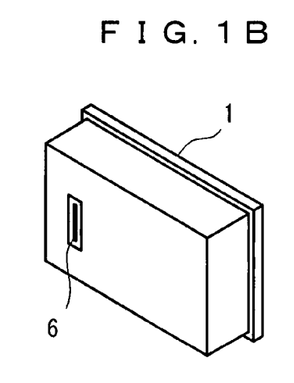
FIG. 1B is a perspective view taken from the back of the display device.
Figure 1C:
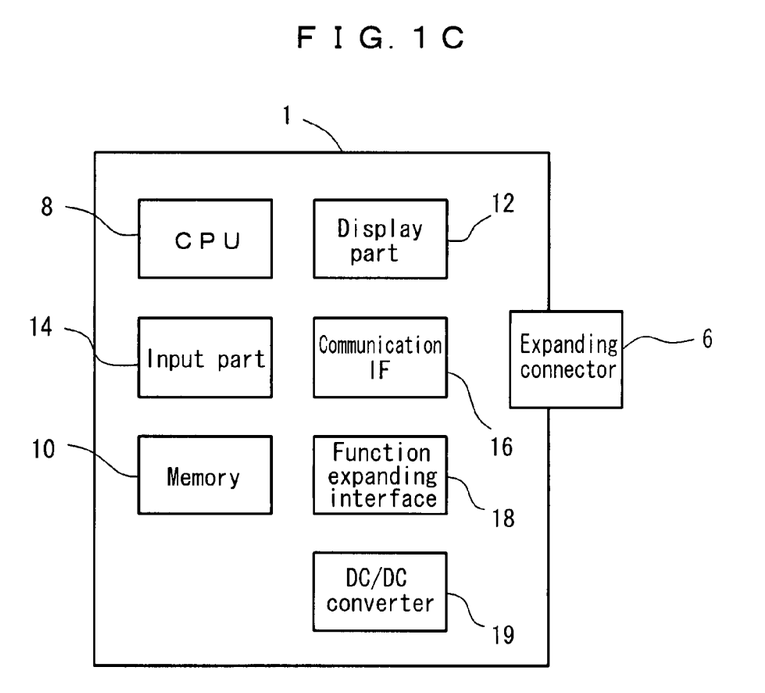
FIG. 1C is a circuit block diagram of the display device.

By referring to FIG. 1A-FIG. 1C, a display device used in a control system will be described. FIG. 1A is a perspective view taken from the front of the display device, FIG. 1B is a perspective view taken from the back of the display device, and FIG. 1C is a circuit block diagram of the display device.

A display device 1 has a rectangular shape when viewed from the front, and comprises a display screen 2 on its front side. The display device 1 comprises a plurality of function keys 4 which are arranged in parallel beneath the display screen 2, and comprises an expanding connector 6 on its back side. When operation components are displayed on the display device 1, an operation-part pin can be focused through operating the function keys 4.

The display device 1 is a programmable display device that can be used as a monitor control display device functioning as an HMI of the control system. The display device 1 comprises a CPU 8, a memory 10, a display part 12, an input part 14, a communication interface 16, a function expansion interface 18, and a DC/DC converter 19 in terms of circuit. The expanding connector 6 is illustrated in FIG. 1C for better understanding. The memory 10 is constituted with a RAM, a ROM, a flash ROM, a VRAM, or the like.

In the display device 1, the CPU 8 is capable of displaying/controlling the state of an external apparatus in accordance with a display control program stored in the memory 10, through communicating with a programmable logic controller (PLC) that controls the external apparatus via the communication interface 16.

The display device 1 uses a touch panel for the input part 14. A user grasps the state and the like of a control-target external apparatus based on the display on the display screen of the display part 12. The user can input a control instruction and the like for the external apparatus by operating the touch panel.

There is a type of display device 1, which has no touch panel. The display part 12 is constituted with a liquid crystal display. When a touch panel is used as the input part 14, the touch panel is arranged on the display screen of the display part 12. Through applying a pressure (touching) the touch panel with a point of a stylus or a fingertip, a signal in accordance with a coordinate value right under the pressed point can be transferred to the CPU 8. The display part 12 has an area that is about the same or slightly smaller than an effective touch area of the touch panel, in which a large number of liquid crystal pixels are arranged crosswise in matrix.

The CPU 8 monitors operations inputted from the touch panel. The CPU 8 can control various kinds of external apparatuses in accordance with the operations of the user inputted to the touch panel that serves as the input part 14.

In a case where a plurality of buttons are displayed in the display device 1, no touch panel may be provided. Since there is no touch panel in such case, it is not possible to perform selecting (focusing) operation with direct and physical touch of fingers and the like. Therefore, the display device 1 can accept the user operations through utilizing the function keys as the operation keys that can be physically operated with fingers and the like. Further, the display device 1 can accept operations through operation keys of bezels B1 and B2 which will be described later.

Illustrations and explanations of a backlight circuit, other circuits, various input/output ports, and the like for the liquid crystal display of the display device 1 are omitted.

Figure 2A:
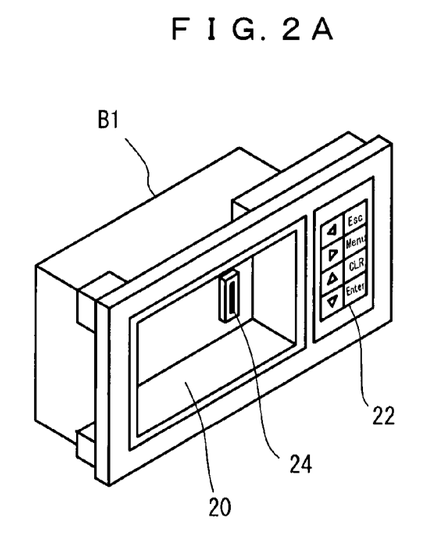
FIG. 2A is a perspective view taken from the front of a first bezel.
Figure 2B:
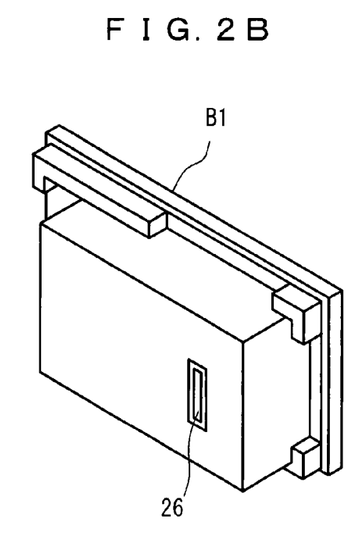
FIG. 2B is a perspective view taken from the back of the first bezel.
Figure 2C:
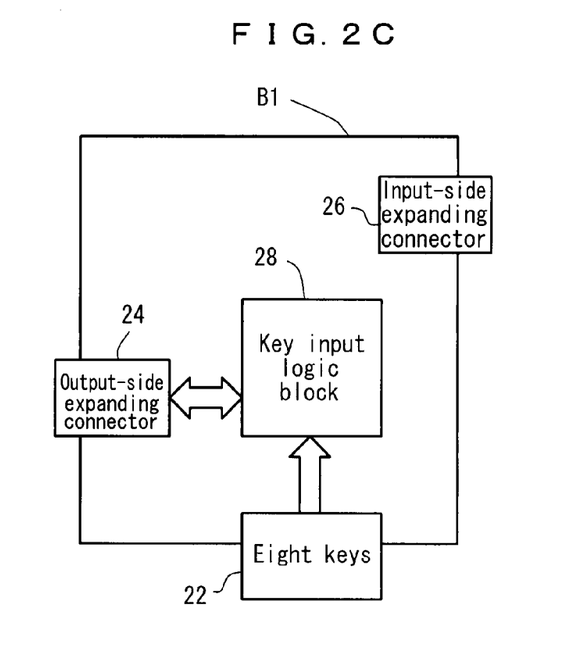
FIG. 2C is a circuit block diagram of the first bezel.

A first bezel B1 as a first function expanding module will be described by referring to FIG. 2A-FIG. 2C. FIG. 2A is a perspective view taken from the front of the first bezel B1, FIG. 2B is a perspective view taken from the back of the first bezel B1, and FIG. 2C is a circuit block diagram of the first bezel B1.

The first bezel B1 comprises an opening 20 for detachably housing the display device 1. The first bezel B1 comprises operation keys 22. An output-side expanding connector 24 is provided at a bottom part of the opening 20. An input-side expanding connector 26 is provided at a rear part of the first bezel B1. The display device 1 is not illustrated in FIG. 2A and FIG. 2B.

As the operation keys for selecting (focusing) the buttons pasted on the display screen of the display device 1, the operation keys 22 are constituted with a total of eight keys, i.e. four arrow keys to scroll the aforementioned buttons on the screen in directions of the arrows, an "Enter" key, an "Esc" key, a "Menu" key, and a "CLR" key.

Each of the arrow keys is used to move the focus on the buttons in the vertical and horizontal directions, and the "Enter" key is operated for finalizing the focus. Explanations of the keys marked with English abbreviations such as "ESC", "Menu", and "CLR" are omitted.

The first bezel B1 comprises a key input logic block 28 loaded inside thereof. Through operations of the arrow keys, and "Esc", "Menu", "CLR", "Enter" keys in the first bezel B1, the key input logic block 28 outputs operation signals that correspond to the operations to the output-side expanding connector 24.

In the first bezel B1, when a function expanding signal is supplied from another function expanding module to the other connector, i.e. the input-side expanding connector 26, the supplied function expanding signal is transmitted to the output-side expanding connector 24. A detailed explanation of the key-input logic block 28 will be omitted.

Figure 3A:
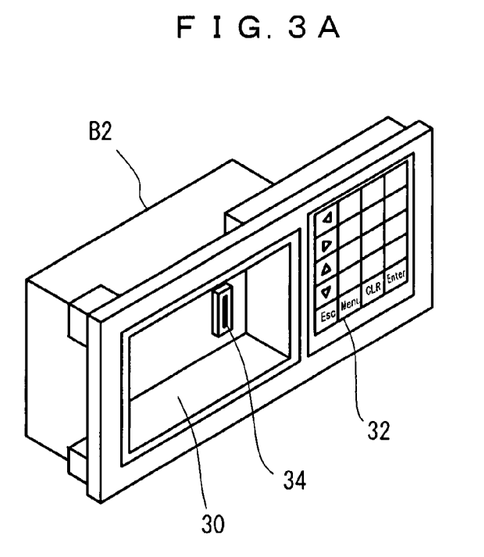
FIG. 3A is a perspective view taken from the front of a second bezel.
Figure 3B:
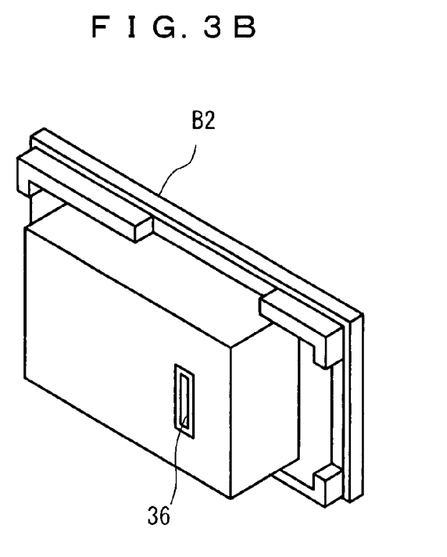
FIG. 3B is a perspective view taken from the back of the second bezel.
Figure 3C:
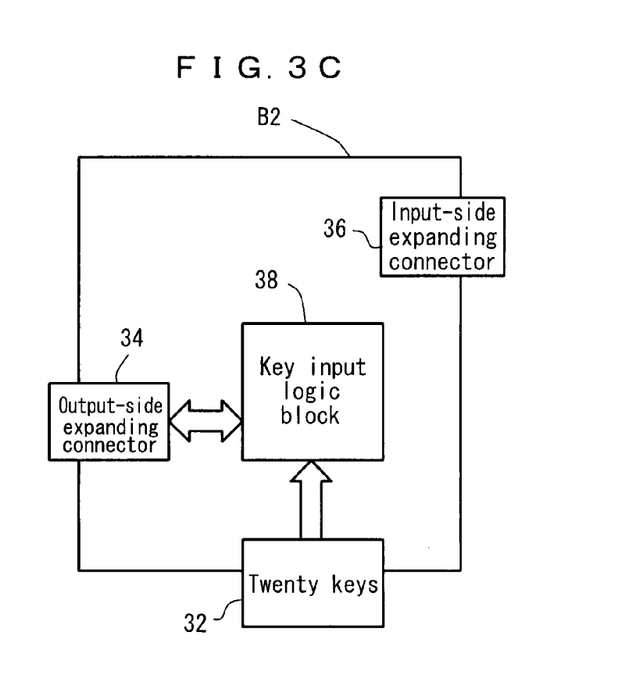
FIG. 3C is a circuit block diagram of the second bezel.

A second bezel B2 as a second function expanding module will be described by referring to FIG. 3A-FIG. 3C. FIG. 3A is a perspective view taken from the front of the second bezel B2, FIG. 3B is a perspective view taken from the back of the second bezel B2, and FIG. 3C is a circuit block diagram of the second bezel B2.

The second bezel B2 comprises an opening 30 for detachably housing the display device, and operation keys 32. An output-side expanding connector 34 is provided at a bottom part of the opening 30. An input-side expanding connector 36 is provided at a rear part of the second bezel B2. The operation keys 32 are constituted with a total of twenty keys, i.e. four arrow keys to scroll the aforementioned buttons on the screen in directions of the arrows, an "Esc" key, a "Menu" key, a "CLR" key, an "Enter" key, numeral value keys, a decimal point key, and the like.

The second bezel B2 comprises a key input logic block 38 loaded inside thereof. Through operations of the arrow keys, "Esc", "Menu", "CLR", "Enter" keys, the numeral value keys, the decimal point key, and the like in the first bezel B2, the key input logic block 38 outputs operation signals that correspond to the operations to the output-side expanding connector 34.

In the second bezel B2, when a function expanding signal is supplied from another function expanding module to the other connector, i.e. the input-side expanding connector 36, the supplied function expanding signal is transmitted to the output-side expanding connector 34. A detailed explanation of the key-input logic block 38 will be omitted.

Figure 4A:
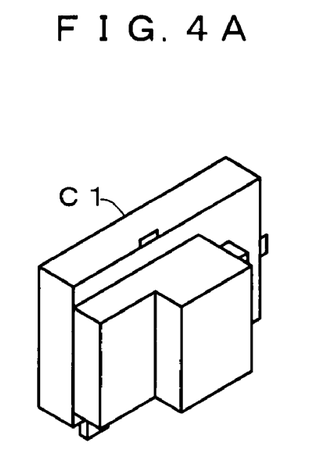
FIG. 4A is a perspective view taken from the front of a first function expanding module.
Figure 4B:
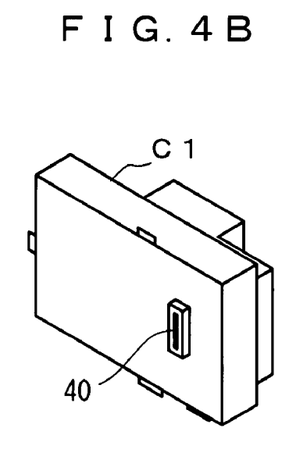
FIG. 4B is a perspective view taken from the back of the first function expanding module.
Figure 4C:
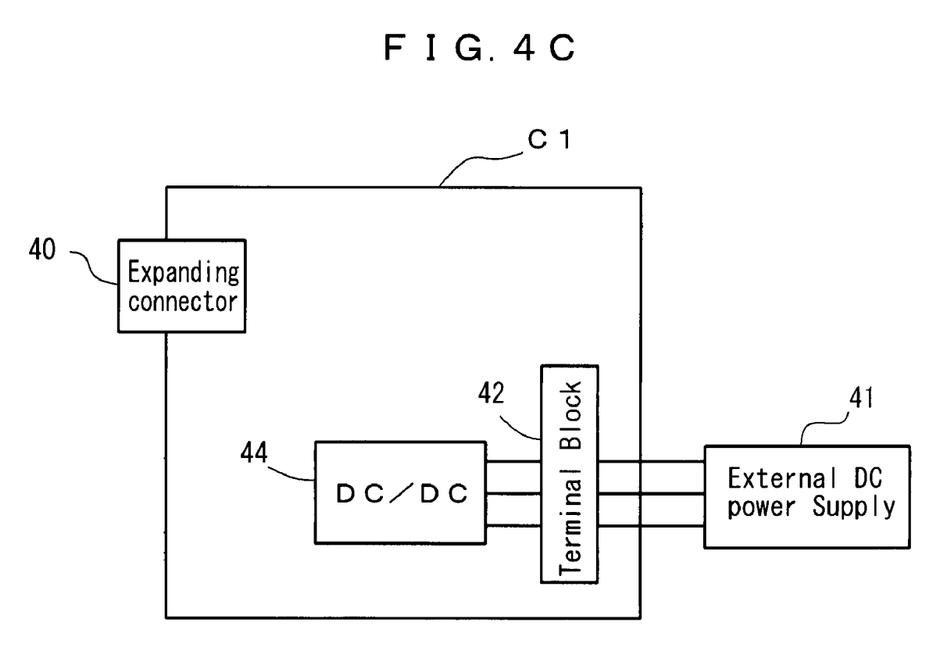
FIG. 4C is a circuit block diagram of the first function expanding module.

A third function expanding module C1 will be described by referring to FIG. 4A-FIG. 4C. FIG. 4A is a perspective view taken from the front of the third function expanding module C1, FIG. 4B is a perspective view taken from the back of the third function expanding module C1, and FIG. 4C is a circuit block diagram of the third function expanding module C1.

The third function expanding module C1 comprises an expanding connector 40 on its back side. The third function expanding module C1 comprises a terminal block 42 and the like on its lateral side.

The third function expanding module C1 comprises a DC/DC converter 44 that is build inside thereof, which is a power supply function expanding part. The DC/DC converter 44 converts a DC voltage supplied from the terminal block 42 into a prescribed DC voltage, and outputs it to the expanding connector 40. Reference numeral 41 is an external DC voltage output power supply.

Figure 5A:
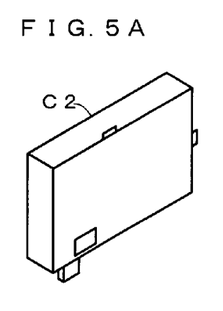
FIG. 5A is a perspective view taken from the front of a fourth function expanding module.
Figure 5B:
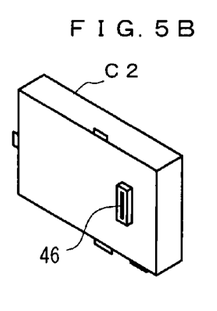
FIG. 5B is a perspective view taken from the back of the fourth function expanding module.
Figure 5C:
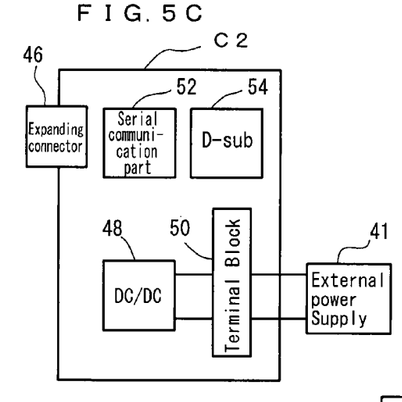
FIG. 5C is a circuit block diagram of the first function expanding module.

A fourth function expanding module C2 will be described by referring to FIG. 5A-FIG. 5C. FIG. 5A is a perspective view taken from the front of the fourth function expanding module C2, FIG. 5B is a perspective view taken from the back of the fourth function expanding module C2, and FIG. 5C is a circuit block diagram of the fourth function expanding module C2.

The fourth function expanding module C2 comprises an expanding connector 46 on its back side. The fourth function expanding module C2 comprises a DC/DC converter 48 that is a power supply function expanding part, a terminal block 50, a serial communication part 52, and a D-sub (D-subminiature) 54. Other function expanding parts are a serial communication function, an I/O function, an Ethernet (registered trademark) function, and the like.

Figure 5D:
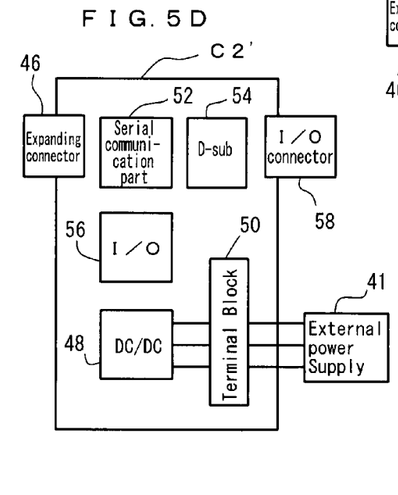
FIG. 5D is a circuit block diagram of a fifth function expanding module.
Figure 5E:
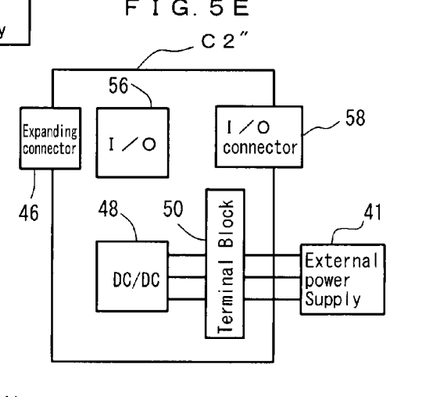
FIG. 5E is a circuit block diagram of a sixth function expanding module.

In such case, an I/O function part 56 and an I/O connector 58 may be provided to make a fifth function expanding module C2' as shown in FIG. 5D. Alternatively, the serial communication part 52, the D-sub 54 may be omitted and the I/O function part 56, the I/O connector 58 may be added to make a sixth function expanding module C2" as in FIG. 5E.

Figure 6:
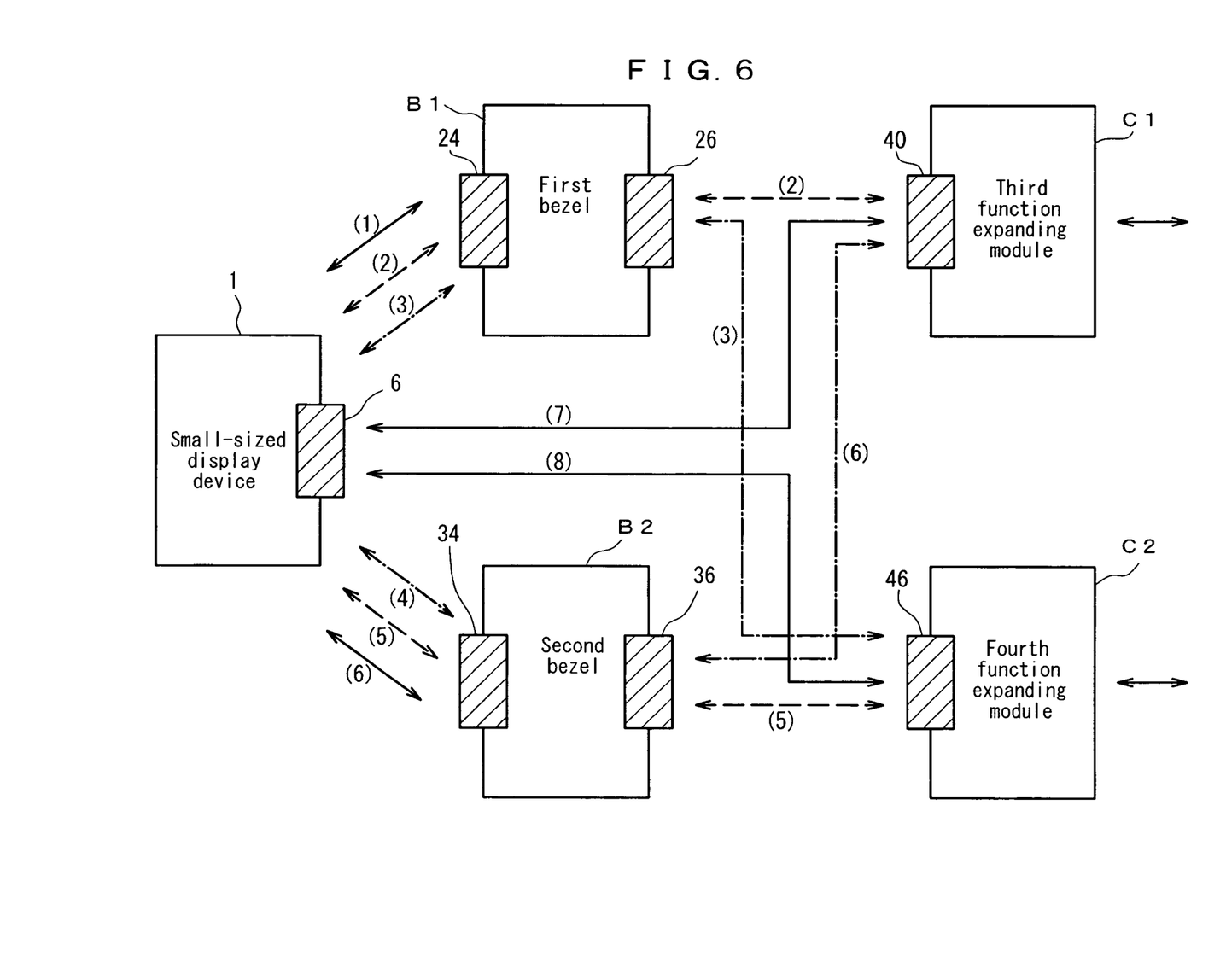
FIG. 6 is an illustration showing a combined example of the small-sized display device, the first bezel, the second bezel, a third function expanding module, and the fourth function expanding module.

FIG. 6 is an illustration showing combination examples of the display device 1, the first bezel B1 as the first function expanding module, the second bezel B2 as the second function expanding module, the third function expanding module C1, and the fourth function expanding module C2. The combination examples are as follows.

However, a combination of the fifth function expanding module C2' and the sixth function expanding module C2" is omitted because of the matter of explanations.
(1) The display device 1 and the first bezel B1
(2) The display device 1, the first bezel B1, and the third function expanding module C1
(3) The display device 1, the first bezel B1, and the fourth function expanding module C2
(4) The display device 1 and the second bezel B2
(5) The first display device 1, the second bezel B2, and the third function expanding module C1
(6) The first display device 1, the second bezel B2, and the fourth function expanding module C2
(7) The first display device 1 and the third function expanding module C1
(8) The display device 1 and the fourth function expanding module C2

Needless to say, there are many different combinations provided based on the types of the function expanding modules. However, as way of examples, the embodiment illustrates the aforementioned eight combinations because of the matter of explanations. Note that the combinations of (1)-(8) are illustrated by using solid lines, broken lines, and alternate short and long dash lines.

Manufactures need to prepare the first bezel B1, the second bezel B2, the third function expanding module C1, the fourth function expanding module C2, the fifth function expanding module C2', the sixth function expanding module C2", etc. for the display device 1.

Figure 7:
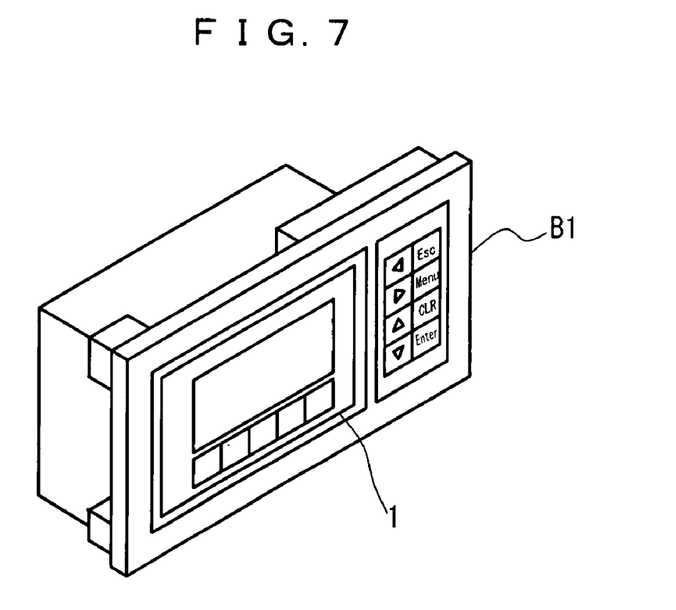
FIG. 7 is an illustration of a mechanism that corresponds to the combined example shown in FIG. 6.

Through preparing the various types of function expanding modules in advance as described, each module can be assembled through the expanding connector as in FIG. 7 to be supplied to a user when the user requests the combination (1) among the aforementioned combinations (1)-(8). Alternatively, when the user requests the combination (2) among the aforementioned combinations (1)-(8), each module can be assembled through the expanding connectors as in FIG. 8 to be supplied to the user.

FIG. 7 shows the combination (1) among the aforementioned combinations (1)-(8).

This combination is of the display device 1 and the first bezel B1, in which the display device 1 is housed in the opening 20 of the first bezel B1. The display device 1 is connected to the first bezel B1 through the expanding connectors 6 and 24 while being housed in the opening 20 of the first bezel B1, and operation signals of the operation keys 22 are supplied to the function expanding interface 18 of the display device 1 via the both expanding connectors 6 and 24. In the display device 1, the CPU 8 controls the display of the HMI component such as buttons that are displayed on the display screen of the display part 12 in accordance with the contents of the operation signals.

As described above, in a case of the combination of the display device 1 and the first bezel B1, the display device 1 is housed in the first bezel B1 in a compact manner. At the same time, the functions of the operation keys 22 of the first bezel B1 as the first function expanding module can be expanded. Therefore, even if the rear part area of the display device 1 is small, the function of the display device can be expanded without spoiling the advantage of the display device as being small in size.

Figure 8:
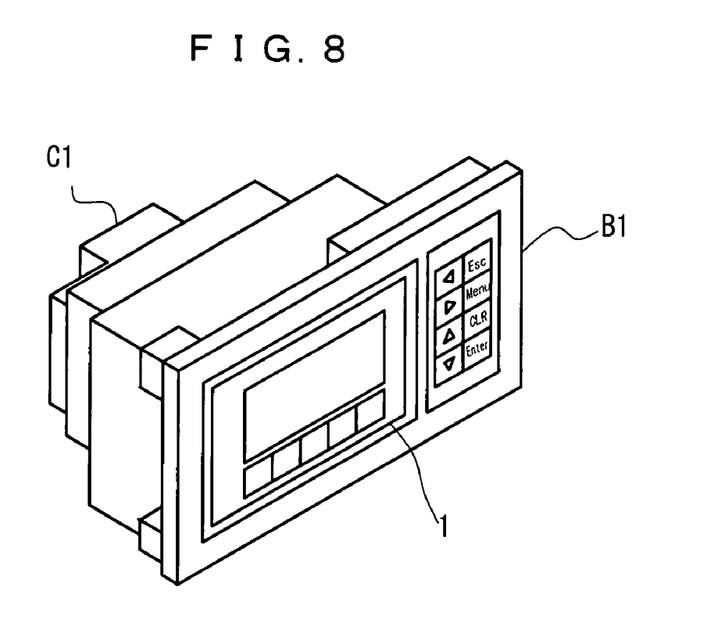
FIG. 8 is an illustration of a mechanism that corresponds to another combined example that is different from the example shown in FIG. 6.

FIG. 8 shows the combination (2) among the aforementioned combinations (1)-(8). This combination is of the first display device 1, the first bezel B1, and the third function expanding module C1. In this combination, the expanding connector 6 of the display device 1 is connected to the expanding connector 24 of the first bezel B1, and the expanding connector 26 in the rear part of the first bezel B1 is connected to the expanding connector 40 of the third function expanding module C1. With this, the operation signals of the operation keys 22 of the first bezel B1 are supplied to the function expanding interface 18 of the display device 1 via the both expanding connectors 6 and 24. At the same time, the DC current of the DC/DC converter 44 (12-24V DC is converted to 5V DC) of the third function expanding module C1 is supplied to the display device 1 through the expanding connector 40 of the third function expanding module C1, the expanding connectors 26, 24 of the first bezel B1, and the expanding connector 6 of the display device 1.

As described above, in a case of the combination of the display device 1, the first bezel B1, and the third function expanding module C1, the display device 1 is housed in the first bezel B1 in a compact manner. At the same time, the functions of the operation keys 22 of the first bezel B1 as the first function expanding module and the functions of the third function expanding module C1 can be expanded.

As described above, with the embodiment, it is unnecessary to provide each of the functions required for the display device on the single display device itself. In addition, it is unnecessary to fabricate the display devices that correspond to each of the required functions. Thus, the cost for manufacturing the display devices can be suppressed. Further, even if the required function changes on the actual scene, it is possible to select and assemble the function expanding modules in accordance with the change. Therefore, unlike the conventional case, it is unnecessary to prepare a large number of display devices for each function so that the cost as well as the time and effort can be decreased dramatically. Furthermore, through preparing the function expanding modules in advance, the manufactures can also follow the changes in the specification required by the users.

Moreover, even if the rear part area of the display device is small because it is the small-sized display device, there is no restriction set in the number of function expanding modules to be mounted. Therefore, it is possible to take a full advantage of the display device as being small in size.

Among the display devise, particularly in a case of a display device that is fitted into the display device attachment opening of a control board (not shown) from its front face, for example, it is fixedly mounted to the opening by being engaged with the outer periphery of the display device attachment opening. Even in such form where the display device is to be fixedly mounted, the function expanding modules can be stacked in the rear part of the display device, for example. Therefore, the display device can be used in various ways.

The present invention has been described in detail by referring to the most preferred embodiments. However, various combinations and modifications of the components are possible without departing from the spirit and the broad scope of the appended claims.

What is claimed is:

1. A display device unit, comprising
a display device that is provided with a first internal circuit and configured to operate by itself, and
a plurality of function expanding modules, each of which comprises a second internal circuit for outputting a function expanding signal required for expanding an input operation function with respect to said display device by a user, and an operation key for the user to input operations, wherein:
said display device and said plurality of function expanding modules respectively comprise an expanding connector for electrically connecting said respective first and second internal circuits by being mechanically connected to each other, under a state where each of said function expanding modules is stacked at a rear part of said display device,
said display device is configured to operate by itself without said modules being stacked,
said input operation function of said display device is configured to be expanded by outputting said function expanding signal to said display device from said function expanding modules when said display device and respective internal circuits of each of said function expanding modules are connected through both of said expanding connectors under a state where said modules are loaded by being stacked, and
the operation key is electrically connected to the second internal circuit and the second internal circuit is configured to output the function expanding signal to the display device for operating the display device according to the input by the user to the operation key.

2. A display device unit, comprising:
a display device that comprises a display screen on its front side, an expanding connector on its rear part side, and an internal circuit as a human-machine interface (HMI) of a control system to be used by said display device itself;
a bezel that comprises an opening capable of housing said display device, operation keys for a user to input operations, an output-side expanding connector at a bottom part of said opening, and an input-side expanding connector on its rear part side; and
a function expanding module that comprises on its front side an expanding connector that can be connected to said input-side expanding connector, wherein:
said display device is configured to operate even by itself without being housed in said opening of said bezel,
said display device is configured to operate with said operation keys of said bezel,
a function of said display device is expanded by a circuit built in said function expanding module under a state where said display device is housed in said opening of said bezel,
said output-side expanding connector of said bezel is connected to said expanding connector of said display device, while said function expanding module is loaded on said rear part of said bezel and said input-side expanding connector of said bezel is connected to said expanding connector of said function expanding module, and
the operation keys of the bezel are electrically connected to the built-in circuit and the built-in circuit is configured to output a function expanding signal to the display device for operating the display device according to the input by the user to the operation keys of the bezel.

* * * * *